United States Patent
Wiegand, Sr.

(10) Patent No.: US 6,378,269 B1
(45) Date of Patent: Apr. 30, 2002

(54) ADJUSTABLE FORM FOR HUB DRAINS

(76) Inventor: Richard Lee Wiegand, Sr., 388 Albany Ave., Shreveport, LA (US) 71105

(*) Notice: Subject to any disclaimer, the term of this patent is extended or adjusted under 35 U.S.C. 154(b) by 0 days.

(21) Appl. No.: 09/258,318

(22) Filed: Feb. 26, 1999

(51) Int. Cl.$^7$ ............................ E04G 21/00; E04G 17/00
(52) U.S. Cl. ................. 52/745.05; 52/220.8; 52/302.1; 249/207
(58) Field of Search ............................ 249/11, 82, 175, 249/13, 39, 207, 91; 52/220.8, 745.05, 745.06, 745.13, 302.1; 264/31, 35; 210/163, 164, 166

(56) References Cited

U.S. PATENT DOCUMENTS

| | | | | |
|---|---|---|---|---|
| 2,324,545 A | * | 7/1943 | Svirsky | 52/220.8 |
| 2,471,301 A | * | 5/1949 | Boosey | 52/220.8 |
| 3,173,443 A | * | 3/1965 | Saville | 52/220.8 |
| 3,832,438 A | * | 8/1974 | Ditcher | 264/274 |
| 4,071,265 A | * | 1/1978 | Wallace | 52/220.8 |
| 4,614,065 A | * | 9/1986 | Papp | 52/220.8 |
| 4,619,087 A | * | 10/1986 | Harbeke | 52/220.8 |
| 4,748,787 A | * | 6/1988 | Harbeke | 52/220.8 |
| 4,877,216 A | * | 10/1989 | Harbeke | 52/220.8 |
| 4,883,590 A | * | 11/1989 | Papp | 210/164 |
| 5,060,986 A | * | 10/1991 | Carter | 52/220.8 |

* cited by examiner

Primary Examiner—Michael Safavi
(74) Attorney, Agent, or Firm—Peter Gibson

(57) ABSTRACT

A cylinder possessing an externally threaded lower end mating an internally threaded drain collar bore seated in the top end of an upright hub drain is threaded into the bore and the elevation of the top end of the cylinder elevationally adjusted with respect to the hub drain. A gasket is compressed between the top face of the drain collar and the bottom surface of a rigid plate which is then secured to the top of the upright cylinder. An annular interior corner of the bottom surface of the plate inside the periphery of the plate locates an annular gasket in the desired disposition. Location of the plate upon the top of the cylinder may be assisted by matching sets of locating pins and holes utilizing a cylinder with a closed top end and the plate may be secured to the top of the cylinder by a bolt passed through an aperture through the plate and threaded into a tapped cavity of the closed top end of a cylinder. The plate may be released from the void effected in the concrete by exerting force against the top face of the drain collar which reacts upward against the plate. Bolts threaded through tapped holes in the plate may be extended to effect this force. Balanced exertion of force is suggested. The resultant void facilitates proper cement finishing with sloping about an adjustable drain strainer threaded into the drain collar without adversely affecting the integrity of the concrete slab.

21 Claims, 3 Drawing Sheets

ADJUSTABLE FORM FOR HUB DRAINS

BACKGROUND OF THE INVENTION

1. Field of the Invention

The general field of the present invention relates to static structures, i.e., buildings, and to pipes and tubular conduits; more particularly to the use of a hollow form or core in the forming of a cavity or cell in a concrete slab and to providing the end of a pipe with a plug or end protector; most specifically to such a form preserving space about a hub type drain in the pouring of a concrete slab floor which includes a threaded end protector.

2. General Background

Hub type drains typically possess a drain collar seated in the open top end of the drain and secured to the same with a plurality of bolts arranged concentrically about a central threaded bore into which an adjustable strainer may be threaded. When a concrete slab floor is poured it desirable to preserve not only (a) the internal threading of the drain collar but also (b) free access to the entire drain collar for the purpose of shimming the same in order to level the drain collar after the floor is poured. It is also desirable to provide for (c) proper sloping of the finished floor proximate the drain strainer in order to achieve desired drainage characteristics and to (d) avoid a plethora of problems commonly encountered during this installation.

The final floor finish is often changed during construction, for example, and the selection of a thicker flooring will require greater depth around the drain. This will necessitate changing of the finished slope about the drain. Provision for slope in the finished floor is often wholly neglected in pouring the slab and burying of the drain during the same is also known to occur on occasion. Another problem associated with this phase of construction is the collision of equipment with the drain thereby displacing the drain from level. Another prevalent problem is that cement finishers often do not finish the slab about a drain to accommodate the finished floor.

It is considered, upon a basis of over thirty-five years experience, that the installation of hub drains during construction involving the pouring of a concrete slab floor is ineluctably and consistently plagued by the problems mentioned above. It is also considered that the only solution to these problems is chipping away concrete about the hub drain which is invariably expensive and consumptive of time.

It is noted that it is a practice of some builders to use forming lumber to block our an area about the drain leaving a rather large hole the entire depth of the slab. This practice adversely affects the integrity of the slab especially below grade. It is also noted that it is a common practice to use foam or insulation wrapped around a drain strainer threaded into the collar in order to enable adjustment of the same after the slab hardens. While preserving the ability to adjust the elevation of the drain strainer this practice neither provides access to the drain collar nor addresses the issue of sloping about the drain.

Discussion of the Prior Art

The following U.S. Patents are considered pertinent to the present invention:

| U.S. Pat. No. | Inventor | Date | Title |
| --- | --- | --- | --- |
| 2,202,147 | Gerriets | May 28, 1940 | Emplacement Former |
| 3,421,551 | Currier | Jan. 14, 1969 | Destructible Article for Reserving a Recess In Concrete |
| 3,800,486 | Harvey | Apr. 2, 1974 | Pipe Spacer |
| 4,620,330 | Izzi, Sr. | Nov. 4, 1986 | Universal Plastic Plumbing Joint |
| 4,823,411 | Nettel | Apr. 25, 1989 | Cleanout Extension Adapter |
| 4,883,590 | Papp | Nov. 28, 1989 | Adjustable Floor Drain Apparatus |
| 5,099,887 | Hooper | Mar. 31, 1992 | Drain Collar |
| 5,623,971 | Foernzler | Apr. 29, 1997 | Drain and Cleanout Spacer |

Gerriets discloses a hollow form having an outer cylindrical wall and an inner "annular wall" both connected by a top plate, all constructed of thin sheet metal or other "severable" material. The interior sleeve is preferably inclined inwardly from top to bottom to facilitate disposition within the open ends of pipes of varying diameter. A patent two years later issued to Gerriets is also noted which adds an inwardly convex shape to the interior sleeve which here fits about the pipe rather than inside the same.

Currier discloses an annular sleeve of "non-water absorbing frangible foamed plastic", preferably polystyrene, which is slit, preferably along a diagonal, for reserving an annular space about an upright pipe, including the mouth of a pipe, during pouring of concrete or concrete. Harvey discloses a "cup-shaped" device, open at the bottom and closed at the top, possessing a cylindrical outer wall and a shorter cylindrical inner wall which possesses inwardly extending "fingers" aligned radially which can be readily broken at intervals along the axial length of each to accommodate varying outer diameters of pipes in positioning of the device about the same.

Izzi, Sr.'s 'universal plastic plumbing joint' discloses use of an outer sleeve with a smooth exterior wall intended to fit inside a pipe's open end with internal threading mating with an externally threaded internal sleeve which can be adjusted elevationally for disposition of a drain relative to the level obtained in pouring a slab of concrete, among other uses. Nettel's 'cleanout extension adaptor' discloses a similar structure using an externally threaded plug mating an internally threaded cylindrical body which possesses a "small thin, lip (extending radially outward) on the top for seating on the top of a cleanout extension". Papp discloses, most pertinently as shown in FIG. 5, use of a disposable sleeve, preferably made of waxed cardboard, which fits snugly inside the open end of an internally threaded pipe and extends upward to provide a cylindrical space above the mouth during pouring of concrete and to keep the internal threading clean during the same.

Hooper discloses a "collar for a drain pipe riser . . . for maintaining an annular space about" the riser during pouring of a concrete slab possessing an external cylindrical sleeve and an internal cylindrical sleeve radially spaced apart from the outer sleeve and connected to the same by at least one set of "webs". The 'drain and cleanout spacer' disclosed by Foernzler possesses two "cup-shaped plastic spacers joined by a flexible web". Each spacer is simply a circular cover with a downwardly depending cylindrical outer wall dimensioned to fit over the exterior diameter of the mouth of drain strainer and a cleanout port, respectively. It is also suggested that a flag extend upwardly from one cover to provide a visual indicator.

Statement of Need

The prior art reviewed above teaches the use of frangible annular shells for the preservation of an annular space about the top of a pipe during the pouring of a concrete slab thereabout and teaches the use of threaded cylindrical members in extension of a drain plate or strainer with respect to a hub drain. The space reserved about the top of the pipe is not, however, adjustable and hence no accurate provision for sloping of the finished cement about the drain is available.

If a frangible form is deployed to reserve space about a drain hub in order to preserve access to a drain collar fitted in the same the form necessarily creates a void about the collar and the drain hub below the level of the collar. This is considered undesirable in adversely affecting the integrity of the installation in a manner similar to the adverse affect upon the integrity of the slab caused by the practice of using forming lumber about a drain noted earlier. It is considered that while it is desired to preserve access to the drain collar, in addition to preserving the internal threading of the same and the ability to adjust the elevation of the drain strainer typically engaging this threading, creating a void in the slab about the drain below the top surface of the drain collar is also undesirable for structural reasons. Another aspect of the frangible forms known in the prior art is that the form is necessarily destroyed in removal. This is considered to be wasteful at best for both economic and environmental reasons.

It is hence considered that a need therefore exists for a form which will preserve an annular space about a hub drain during pouring of a concrete slab floor about the same which will not create a void below the top surface of the drain collar and which will preserve an annular space about the drain which facilitates sloping of the finished cement floor about the drain. It is further considered that a need exists for such a form which is capable of accommodating changes in finished floor elevation during construction in preserving an annular space about the drain which facilitates sloping of the finished cement floor. And it is considered that a need further exists for such a form which is reusable in order to be conservative of both economical and environmental resources.

SUMMARY OF THE INVENTION

Objects of the Invention

The encompassing object of the principles relating to the present invention is the facilitation of proper installation of a hub type drain with a drain strainer which is adjustable in elevation relative to a drain collar seated in the top end of an upright drain pipe with a form preserving both a void about the drain which provides for sloping of the finished cement floor proximate the drain strainer and the integrity of the concrete slab thereabout.

A first auxiliary object of the principles relating to the present invention is a form which preserves a void about a hub type drain which preserves the ability to adjust the elevation of the drain strainer relative to the drain collar during installation of the drain while pouring a concrete slab floor about the drain.

A second auxiliary object of the principles relating to the present invention is a form which preserves a void about a hub type drain which preserves full access to the drain collar during installation of the drain while pouring a concrete slab floor about the drain so that the drain collar may be removed from the top end of the upright drain pipe and shimmed in order to level the drain collar.

A third auxiliary object of the principles relating to the present invention is a form which preserves a void about a hub type drain which possesses a shape relative to the anticipated level of the finished floor and the accordingly desired level of the adjustable drain strainer suited for effecting a proper sloping about the drain strainer with a minimum of time, skill, and expense in finishing the cement floor about the drain.

A fourth auxiliary object of the principles relating to the present invention is a form which preserves a void about a hub type drain which may be elevationally adjusted relative to both the anticipated level of the finished floor and the accordingly desired level of the adjustable drain strainer with a minimum of time, skill, and expense in installation of a hub type drain during pouring of a concrete slab floor about the same.

An ancillary object of the principles relating to the present invention is a form which preserves a void about a hub type drain during pouring of a concrete slab floor about the same which is reusable and thereby both environmentally and economically conservative.

Other objects of the principles relating to the present invention include the avoidance of problems typically encountered during installation of a hub type drain during pouring of a concrete slab floor about the same which are rectified only by chipping out cement about the drain.

Principles Relating to the Present Invention

In meeting the above stated objectives it is suggested that a form comprised of a substantially round rigid plate centrally attachable to the top end of an externally threaded cylinder and possessing means of retaining an annular compressible gasket disposed between the bottom surface of the plate and the top surface of a drain collar substantially concentric with and interior to the periphery of the plate be utilized.

The externally threaded cylinder mates with the internally threaded bore of the drain collar and the top of the cylinder may hence be precisely adjusted with regard to elevation above the top surface of the drain collar. The plate is attached to the top of the cylinder after elevational adjustment and secured to the same preferably with the annular gasket in a state of compression between the bottom surface of the plate and the top surface of the upright drain collar including the periphery of the same. The periphery of the rigid plate extending radially beyond the annular gasket is dimensioned to provide a shallow peripheral void continuous with the void effected by the annular gasket between the top surface of the upright drain pipe and the bottom surface of the plate after pouring of a concrete slab floor about the drain is made.

It is also suggested that means of facilitating release of the form from the void in the hardened concrete slab be provided. The use of a plurality of thrust bolts threaded through the plate in a substantially concentric pattern such that each bolt will contact the top surface of the drain collar which effectively comprises the top surface of the upright drain pipe when sufficiently extended and push the plate away from the same when the thrust bolts are extended further is specifically recommended. As an alternative to bolts it is considered that the plate may be released with the use of several air cylinders each displacing a rod downward with operation of a lever which would also force a thrust rod downward against the top surface of the drain collar seated in the top end of the upright drain pipe.

It is further suggested that the top end of the cylinder be closed and have a central threaded bore through and a plurality of locating projections extending upward therefrom mating apertures through the plate. A single central bolt will then serve to secure the plate to the top of the cylinder after positioning of the plate upon the same by matching the projections with the apertures. After hardening of the poured slab this central bolt may be removed, the thrust bolts or other means of releasing the form utilized to free the plate, and the plate and the annular gasket may then be removed from the resulting cavity. The threaded cylinder is removed from the drain collar with counterclockwise rotation and the adjustable drain strainer is threaded into the drain collar.

The resultant void leaves the top surface of the drain collar entirely free so that the same may be removed and, if desired, shimmed in order to bring into level. The internally threaded bore of the drain collar is protected and an adjustable drain strainer may still be adjusted elevationally. The void effected by the periphery of the plate is continuous with the void above the top surface of the drain collar and dimensioned to allow finishing of the concrete floor about the drain strainer with a proper slope. The entire void, moreover, does not extend below the top surface of the upright drain pipe and the integrity of the concrete slab about the upright drain pipe is maintained.

If the final finished floor elevation is altered during construction with selection of thicker flooring, for example, the form is adjustable with respect to elevation above the drain collar seated in the top end of the upright drain pipe. The threading of the cylinder into the drain collar alone, with or without the plate positioned upon or secured to the same, provides a visual indication of the drain location which will assist in avoiding both accidental burial of the top end of the upright drain pipe during pouring of the concrete and collision with the same during construction. The top of the cylinder, moreover, provides a readily checked and adjustable indication of the elevation desired of the finished cement floor and the use of the form assures that adequate provision for proper sloping about the drain in finishing.

Other advantages and benefits anticipated with use of a form in accordance with the principles relating to the present invention may become evident in a reading of the detailed discussion below, especially if made with reference to the drawings attached hereto.

DETAILED DESCRIPTION OF A PREFERRED EMBODIMENT

Figure 1:
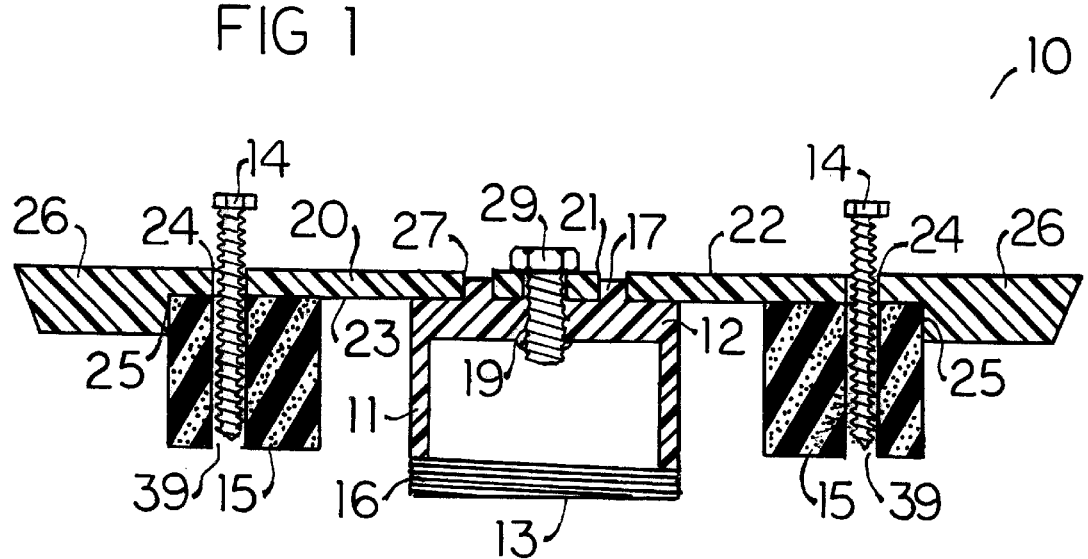
FIG. 1 is a cross sectional view taken from a side of a preferred embodiment of the principles relating to the present invention.

An adjustable form 10 in accordance with the principles relating to the present invention is depicted in FIG. 1 possessing a substantially rigid plate 20 horizontally disposed upon the top end 12 of a vertically oriented cylinder 11 which possesses external threading 16 extending upward from an opposed lower end 13. A compressible gasket 15 is seen abutting the bottom surface 23 of the plate 20, fitted into an interior corner 25 inside the enlarged periphery 26 of the plate 20. A pair of thrust bolts 14 are seen each extending downward through a thrust aperture 24 in the plate 20 tapped to mate the threading of these thrust bolts 14 and through a smooth axial aperture 39 through the gasket 15. A central attachment bolt 29 is depicted extending through a smooth aperture 21 through the plate 20 and threaded into a tapped cavity 19 in the top end 12 of the cylinder 11 which arrangement perpendicularly secures the plate 20 to the top end 12 of the cylinder 11. Prior to attachment the plate 20 is first preferably positioned upon the top end 12 of the cylinder by alignment of a plurality of locating holes 27 with a congruent plurality of locating pins 17 bringing the plate bottom surface 23 essentially flush with the top end 12 of the cylinder 11.

Figure 2:
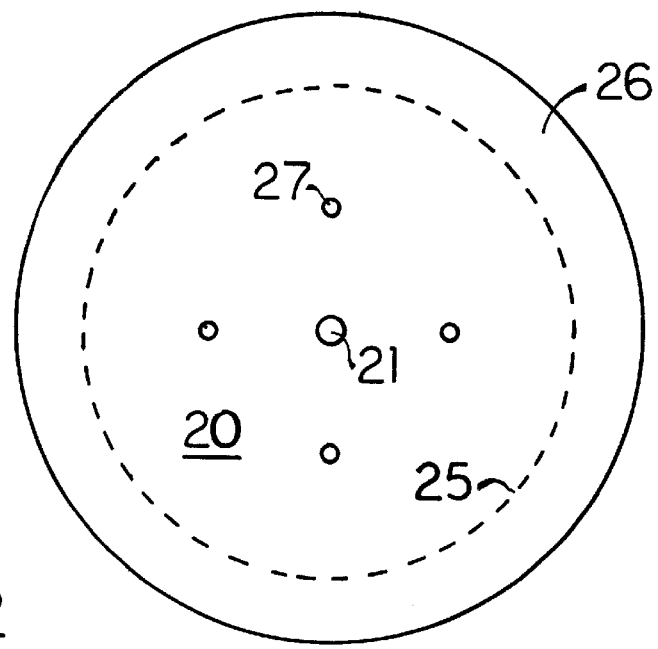
FIG. 2 is a plain elevational view taken from the top of the preferred embodiment depicted in FIG. 1.
Figure 3:
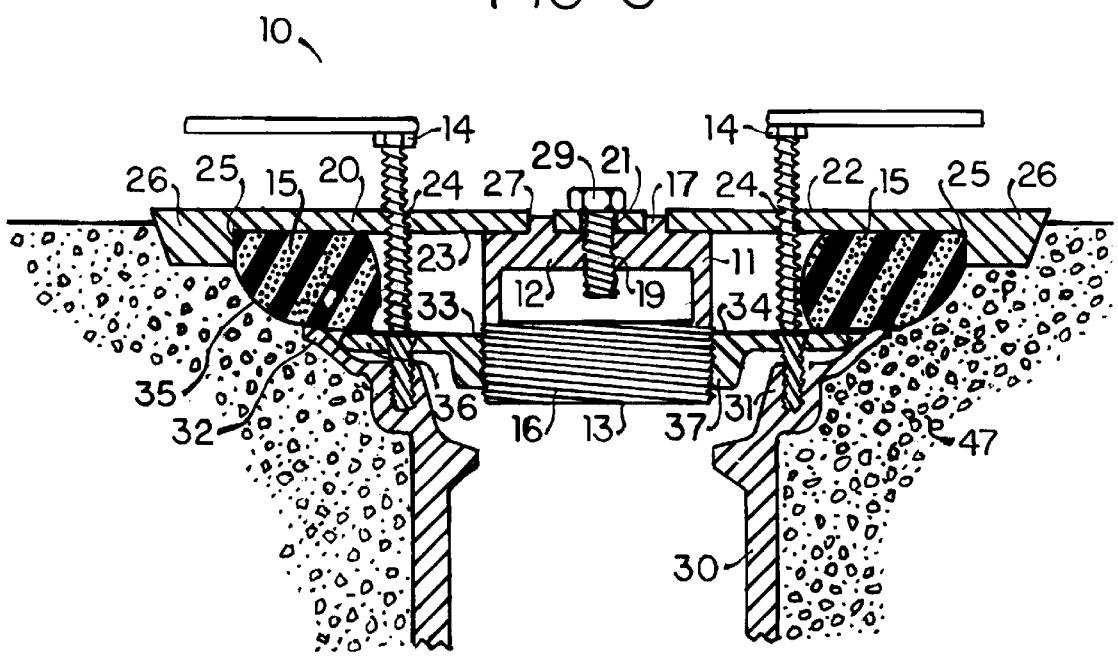
FIG. 3 is a cross sectional view taken from a side of a preferred embodiment of the principles relating to the present invention utilized in installation of a hub drain during pouring of a concrete slab floor thereabout.

The adjustable form depicted in FIGS. 1–3 comprises a preferred embodiment of the principles relating to the present invention which, as best seen in FIG. 2, possesses a generally round configuration. The periphery 26 of the plate 20 is circular, the gasket 15 is annular, the thrust apertures 24 and locating holes 27 are arranged in a pattern which is concentric with the periphery 26 of the plate 20 and the centrally located smooth aperture 21 through which the attachment bolt 29 engages the centrally located and axially aligned tapped cavity 19 in the top end 12 of the cylinder 11 which is disposed in a concentric and axially aligned relation with the plate 20. All these concentric and axially aligned relations are considered to provide convenience in manufacture and use of the adjustable form 10 as the lower end 13 of the cylinder 11 is threaded into the threaded bore 33 of a drain collar 37 seated in the top end 31 of a hub drain 30 about which sloped finishing is intended.

As seen in FIG. 3 the adjustable form 10 is intended to be located above and about a hub drain 30 prior pouring of a concrete slab floor 47. With the gasket 15 compressed between the bottom surface 23 of the plate 20 and the top surface 34 of the drain collar 37 seated in the top end 31 of a hub drain 30 a continuous void 35 from the periphery 26 of the plate 20 to the top surface 34 of the drain collar 37 is effected which does not extend below the top end 31 of the hub drain 30 and hence does not adversely affect the integrity of the concrete slab 47 poured with respect to the installation as the void created is wholly above grade. The sizing of the gasket 15 and the thickness and shape of the periphery 26 of the plate 20 ensure that a void of a depth and shape appropriate to facilitate proper sloping of the finished cement floor about the hub drain 30 is effected with correct usage.

After hardening of the concrete slab 47 the attachment bolt 29 is removed and the plain thrust bolts 14 seen in FIG. 1, or the T-head thrust bolts 14 seen in FIG. 3, are extended downward by application of torque in the correct direction until the top surface 34 of the drain collar 37 is contacted and then extended further thereby displacing the plate 15 from the cavity. The gasket 15 and the cylinder 11 are readily removed following removal of the plate 20 and an adjustable strainer (not shown) is readily threaded into the threaded bore 33 of the drain collar 37, adjusted in elevation and the cement finished about the same. If leveling of the drain collar 37 is desired after hardening of the concrete slab 47 the drain collar 37 may be removed and shimmed as the void 35 created includes all of the top surface 34 of the drain collar 37 including the periphery 36 of the same.

Figure 4:
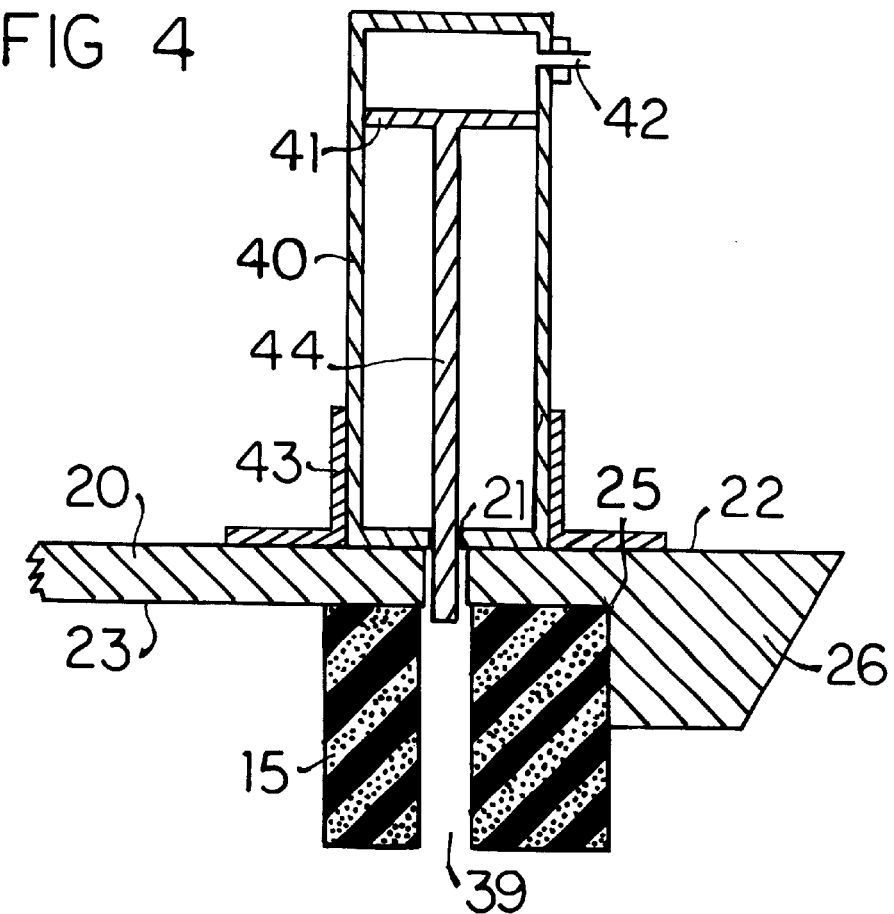
FIG. 4 is cross sectional view taken from a side of an automatic release means for a preferred embodiment of the principles relating to the present invention.

It is considered that other means of obtaining release of the form 10 from the void created in the concrete slab 47 may be utilized if desired. The plain thrust bolts 14 seen in FIG. 1 require an additional tool in order to apply the torque necessary to effect release. The T-head thrust bolts 14 depicted in FIG. 3 are adapted to manual application of torque effecting release without the need for a tool. The means of release might be farther facilitated with a linked lever arm driving a thrust rod 44 through a thrust aperture 24 in the plate 20 or even driven as shown in FIG. 4 wherein an air cylinder 40 is used to drive a thrust rod 44 extending from the piston 41. The air cylinder 40 has a mounting 43 to the plate 20 and an air hose fitting 42 for connection to a compressor which is considered to be a typical piece of equipment utilized in concrete work.

It is further noted that, as depicted in FIG. 4, the thrust apertures 24 through which the thrust rods 44 extend are preferably smooth and, though this is not a preferred aspect, both the thrust apertures 24 and the thrust rods 44 are configured within the compressible gasket 15 which is solid. It is actually preferred that the thrust apertures 24 be located and the thrust rods 44 extend through axial oriented apertures 39 through the gasket 15 as depicted for the thrust bolts 14 in FIGS. 1–3 but this aspect is not necessary to fulfillment of the principles relating to the present invention. It is necessary that thrust be exerted upon the top surface 34 of the drain collar 37 by release means attached to the top plate 20 and it is preferred that this thrust be exerted against said top surface 34 proximate the periphery 36 of the drain collar 37 and since it is preferred that the compressible gasket 15 be located in compression against the same periphery 36 it is accordingly preferred to locate the member exerting thrust within the same radial margin occupied by the gasket 15.

Other aspects of the adjustable form 10 may be modified while keeping within the scope and spirit of the present invention. It is not necessary that the plate 20 be round, for instance, or that any of the concentric patterns and axial alignments mentioned above be utilized apart from the use of an cylinder 11 possessing external threads 16. The plate 20 might be hexagonal, octagonal, or of irregular shape with regard to the periphery 26 though a regular shape would be more easily constructed and a circular periphery 26 is considered best with regard to sloped finishing about a drain 30. It is not necessary that the compressible gasket 15 be annular but that shape is preferred in order to facilitate both manufacture and use as it is desired to compress the gasket 15 between the bottom surface 23 of the plate 20 and the peripheral portion of the top surface 34 of the drain collar 37 so that the entire top surface 34 of the drain collar 37 is clear. Since the periphery 36 of the drain collar 37 is circular an annular gasket 15 is considered best.

It is desirable to contact the top surface 34 of the drain collar 37 with the thrust bolts 14 or thrust rods 44 utilized in the means of release and the circular periphery 36 of the drain collar 37 suggests a concentric pattern of thrust apertures 24 and thrust bolts 14 as depicted in FIGS. 1–3 which are both further noted to possess a parallel axial orientation with regard to the cylinder 11, normal to the round plate 20. It is considered that neither a regular pattern, concentric or otherwise, of thrust apertures 14 is required and further that the threaded thrust apertures and the thrust bolts 14 needn't necessarily be normal to the plate 20, though this is easier to make and is also preferred as a more stable arrangement than having the thrust bolts 14 angled in contact with the top surface 34 of the drain collar 37 which is substantially parallel to the bottom surface 23 of the plate 20 as the cylinder 20 is perpendicular to the drain collar 37 and the bottom surface 23 of the plate 20 is hence perpendicular to the cylinder 20.

The attachment bolt 29 depicted in FIGS. 1–3 extends through a smooth aperture 21 which is central and preferably normal to the round plate 20 suggested and engages a tapped cavity 19 in the top end 12 of the cylinder 11 which is preferably aligned with the central longitudinal axis of the cylinder 11. The central location and axial alignment of the tapped cavity 19 and the attachment bolt 29 threaded into the same is preferred for both ease in construction and use. The concentric pattern of locating pins 17 extending upward from the top end 12 of the cylinder 11 and congruent locating holes 27 through the plate 20 is similarly preferred to facilitate both manufacture and utilization but is unnecessary to fulfillment of the principles relating to the present invention.

It is noted that a perpendicular and radially balanced disposition of the plate 20 with respect to the top end 12 of the cylinder 11 is, in particular, preferred in order to provide a balanced structure when the plate 20 is secured to the top end 12 of the cylinder 11 and to establish an appropriately shaped void for proper finishing of the cement floor about the drain 30 as well as to facilitate manufacture of the form 10. The cylinder 11 possesses external threading 16 extending upward from its lower end 13 in order to permit threading of the cylinder 11 into the threaded bore 33 of the drain collar 37 seated in the top end 31 of an upright hub drain 30. The cylinder 11 depicted in FIGS. 1–3 is substantially hollow except for the top end 12 which is closed. This cylinder 11 might actually be solid with regard to the principles relating to the present invention though this would only add unnecessary weight and expense and is considered wholly undesirable.

Figure 5:
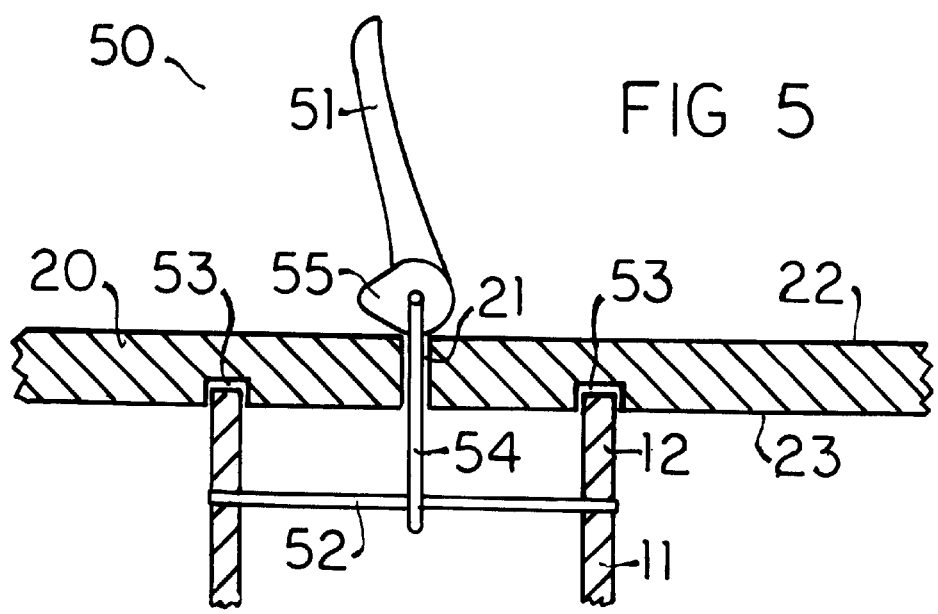
FIG. 5 is a cross sectional view taken from a side of an quickly released mechanism for attachment of the rigid plate substantially perpendicular to the top of an externally threaded cylinder open at either end.

The use of a wholly hollow cylinder 11, alternatively, is considered desirable in order to minimize weight and expense in manufacture. Such a cylinder 11, possessing two open ends, is depicted in FIG. 5 with the top end 12 engaging an annular locating groove 53 in the bottom surface 23 of the plate 20 which is preferably, for the reasons discussed above, concentric with a round periphery 26 of a plate 20. The means of attachment of the plate 20 to the top end 12 of the cylinder 11 depicted in FIG. 5 also differs with the means depicted in FIGS. 1–3.

A smooth aperture 21 through the plate is still utilized and this aperture 21 is still centrally located and preferably axial to a round plate 20 for the same reasons discussed above and further preferably in axial alignment with the cylinder 11 for said same reasons. However, rather than utilizing an attachment bolt 29 engaging a tapped cavity 19 in the top end 12 of the cylinder 11, a cam mechanism 50 is suggested which is essentially quicker in operation than torquing a bolt 29 in securing the plate 20 to the top end 12 of the cylinder 11. In the disposition shown in FIG. 5 the lever 51 of the cam mechanism 50 is displaced downward into a substantially flush disposition with the top surface 22 of the plate 20 which action rotates the cam 55 pulling the link arm 54 pivoted at the top end to the cam 55 and at the bottom end to an anchor pin 52 rigidly fixed to the top end 12 of the cylinder 11 thereby drawing the plate 20 into an attachment with the top end 12 of the cylinder 11 secured by the seating of the same within the annular locating groove 53.

With regard to the materials and construction of an adjustable form 10 in accordance with the principles relating to the present invention it is considered that there is very little involved which is beyond the prudent judgement of a competent machinist. If thrust bolts 14 are used it is recommended that a substantial diameter both be utilized in order to provide the strength required. A relatively large diameter attachment bolt 29 is preferred for the same reason and to provide a large pitch for quicker fastening. The rigid plate 20 is preferably polyvinyl chloride (PVC) or similar standard grade piping, either plastic as depicted in FIG. 1 or metal as depicted in FIG. 3, the compressible gasket preferably a closed cell foam elastomeric as indicated in the drawings. The cylinder is also preferably PVC or similar standard grade piping, either plastic as depicted in FIG. 1 or metal as depicted in FIG. 3. The locating pins 17, if utilized, are readily fixed to the top end 12 of a closed cylinder 11 by drilling interference holes through the same and forcing steel pins 17 or dowels into holes.

The foregoing is intended to provide one practiced in the art with what is considered to be the best known manner of making and utilizing an embodiment in accordance with the principles relating to the present invention and is not to be considered in any manner restrictive of the scope of the invention or the rights and privileges granted by letters patent for which I claim:

1. An adjustable form intended for use during the pouring of concrete about an upright hub type drain with a drain collar seated in the top end possessing a top surface, a periphery, and an internally threaded bore, said form comprising:

a substantially rigid plate possessing a lower surface, an upper surface and a periphery, a cylinder possessing external threading extending upward from a lower end mating an internally threaded bore of a drain collar, a compressible gasket, and attachment means for securing said plate to a top end of said cylinder;

said lower end of said cylinder being threadable into an internally threaded bore of said drain collar seated in the top end of an upright hub drain and given an upright disposition by which the top end of said cylinder is elevationally adjustable with rotation of said cylinder in engagement with said internally threaded bore of said drain collar;

said rigid plate being attachable to the top end of said cylinder in a substantially perpendicular disposition with relation to said cylinder by said attachment means which secure said plate to said top end of said cylinder;

said gasket being disposed in contact with said lower surface of said plate and being compressible against a top surface of a drain collar seated in the top end of an upright hub drain with attachment of said plate to said top end of said cylinder utilizing said attachment means;

whereby pouring of a slab of concrete about a drain hub having a drain collar seated in the top end with said gasket compressed between the top surface of the drain collar and the bottom surface of said plate secured to the top end of said cylinder threaded into the internally threaded bore of the drain collar preserves a void about and above the hub drain which is provides for sloping of the finished cement floor and which does not extend below the top end of the upright hub drain, thereby preserving the integrity of the concrete slab.

2. The adjustable form of claim 1 wherein said plate is substantially round and said periphery of said plate is substantially circular.

3. The adjustable form of claim 1 wherein said gasket is annular and said bottom surface of said plate possesses a circular interior corner against which said gasket may be butted.

4. The adjustable form of claim 1 wherein said attachment means is comprised of an attachment bolt which extends through a smooth aperture through said plate and threads into a tapped cavity in a closed top end of said cylinder.

5. The adjustable form of claim 4 wherein said smooth aperture through said plate through which said attachment bolt extends is centrally located with respect to said plate.

6. The adjustable form of claim 1 wherein said attachment means is comprised of a cam mechanism possessing a cam rotated by displacement of a lever which action pulls a link arm pivoted at one end to the cam and at the other end to a anchor pin rigidly fixed to the top end of said cylinder.

7. The adjustable form of claim 1 further possessing means of locating said plate in attachment with the top end of said cylinder which provides a palpable positioning of the plate with respect to the cylinder.

8. The adjustable form of claim 7 wherein said means of locating said plate in attachment with the top end of said cylinder is comprised of an annular groove in the bottom surface of said plate into which an open end of said cylinder fits.

9. The adjustable form of claim 7 wherein said means of locating said plate in attachment with the top end of said cylinder is comprised of a plurality of locating pins and congruent locating holes into which the locating pins fit in positioning of said plate with respect to said cylinder in attachment thereto.

10. The adjustable form of claim 9 wherein said pins extend upward from a closed top end of said cylinder and said locating holes are through said plate.

11. The adjustable form of claim 1 further possessing means of releasing said plate from the void created in concrete by the form which, attached to said plate, exerts thrust upon the upper surface of the drain collar.

12. The adjustable form of claim 11 wherein said means of release exerts thrust upon the upper surface of the drain collar in a balanced concentric pattern.

13. The adjustable form of claim 11 wherein said means of release is comprised of a plurality of pneumatic cylinders mounted to said plate which each have a thrust rod extending through an aperture through said plate.

14. The adjustable form of claim 11 wherein said means of release is comprised of a plurality of thrust bolts each threaded through a thrust aperture through said plate tapped to mate the thrust bolt.

15. The adjustable form of claim 14 wherein each said thrust bolt possesses a T-shaped head allowing manual application of torque.

16. A method of creating a void about an upright hub type drain with a drain collar seated in the top end possessing a top surface, a periphery, and an internally threaded bore, said method comprising:

the step of threading a lower end of an externally threaded cylinder possessing a top end into the internally threaded bore of a drain collar seated in the top end of an upright hub type drain thereby permitting adjustment of the elevation of said top end of said cylinder with respect to the drain collar;

the step of compressing a compressible gasket between the bottom surface of a substantially rigid plate possessing a periphery and the top surface of said drain collar;

the step of securing said plate to the top end of said cylinder in a substantially perpendicular disposition;

the step of pouring a concrete slab about the hub drain and form.

17. The method of claim 16 wherein said step of securing said plate to the top end of said cylinder in a substantially perpendicular disposition is completed by tightening an attachment bolt extending through an aperture through the plate and engaging a tapped cavity in a closed upper end of said cylinder.

18. The method of claim 16 further including the step of locating the plate with respect to the top of cylinder prior to the step of securing said plate to the top end of said cylinder in a substantially perpendicular disposition.

19. The method of claim 18 wherein the step of locating the plate with respect to the top of cylinder prior to the step of securing said plate to the top end of said cylinder in a substantially perpendicular disposition is completed by fitting a plurality of pins extending upward from the top end of the cylinder with a congruent set of holes through the plate.

20. The method of claim 16 further including the step of releasing the plate from the void created in the concrete slab after hardening of the slab by exerting a force against the top surface of the drain collar reacting upward against said plate.

21. The method of claim 20 wherein the step of releasing the plate from the void created in the concrete slab after hardening of the slab by exerting a force against the top surface of the drain collar reacting upward against said plate is completed by applying torque to each of a plurality of bolts threaded through tapped apertures through the plate.

* * * * *